US005365273A

United States Patent [19]

Correa et al.

[11] Patent Number: 5,365,273

[45] Date of Patent: Nov. 15, 1994

[54] METHOD AND DEVICE FOR FILM-MODE DETECTION

[75] Inventors: Carlos Correa, VS-Schwenningen; Rainer Schweer, Niedereschach, both of Germany

[73] Assignee: Deutsche Thomson-Brandt GmbH, Villengen-Schwenningen, Germany

[21] Appl. No.: 52,048

[22] Filed: Apr. 23, 1993

[30] Foreign Application Priority Data

Apr. 24, 1992 [DE] Germany .............................. 4213551

[51] Int. Cl.[5] .............................................. H04N 7/18

[52] U.S. Cl. .................................... 348/452; 348/449; 348/700

[58] Field of Search .......................... 358/160, 105, 97; 348/452, 449, 604, 701, 700; H04N 7/18

[56] References Cited

U.S. PATENT DOCUMENTS 4,127,869 11/1978 Millward ................................ 358/54
4,924,306 5/1990 Van der Meer et al. ........... 348/701
4,941,045 7/1990 Birch .................................... 348/700
4,982,280 1/1991 Lyon et al. ........................... 358/105
5,023,713 6/1991 Nishigori ............................. 358/105
5,153,719 10/1992 Ibenthal .............................. 358/105

FOREIGN PATENT DOCUMENTS 0298362 1/1989 European Pat. Off. ........ H04N 5/44
3809249 9/1989 Germany ......................... H04N 5/14
4031921 4/1992 Germany ......................... H04N 7/13

*Primary Examiner*—Mark R. Powell
*Assistant Examiner*—Jeffrey S. Murrell
*Attorney, Agent, or Firm*—Joseph S. Tripoli; Eric P. Herrmann; Ronald H. Kurdyla

[57] ABSTRACT

A film mode detection method and corresponding relatively non complex hardware implementation compares the amplitudes of pixels of corresponding image areas of three successive field to determine if the pixel amplitudes are monotonically increasing or decreasing. Depending on the comparison a positive or negative polarity indication is generated and these indications are combined within each field to generate a polarity indication representing each respective field. The field sequence of such field polarity indications are thereafter compared with a predetermined pattern to determine whether the video signal is from a film or video-mode source.

12 Claims, 2 Drawing Sheets

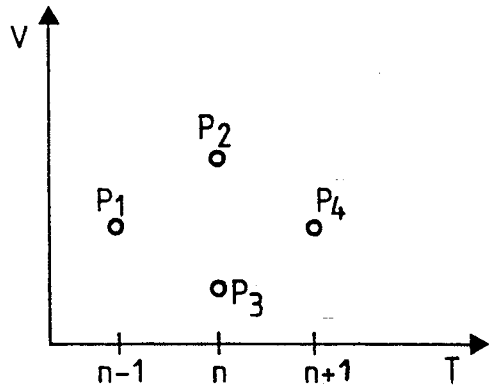
Fig.1
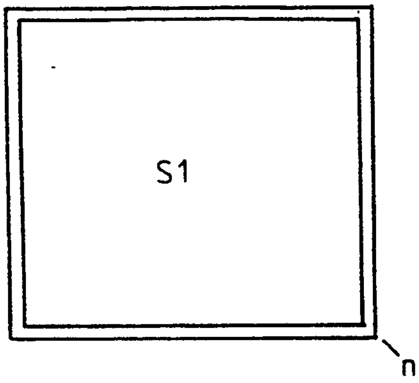
Fig.2
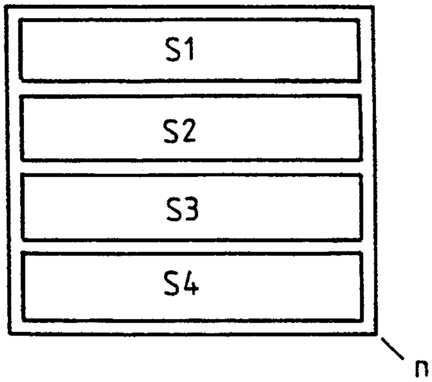
Fig.3
| F | n | n+1 | n+2 | n+3 | n+4 | | n+63 |
|---|---|---|---|---|---|---|---|
| S1 | + | − | + | − | + | | − |
| S2 | + | − | + | − | + | [....] | − |
| S3 | + | − | + | − | + | | − |
| S4 | + | − | + | − | + | | − |
Fig. 4

METHOD AND DEVICE FOR FILM-MODE DETECTION

This invention relates to a method and apparatus for film-mode detection, as for example in HDMAC and PALplus television systems.

BACKGROUND OF THE INVENTION

Certain high end television receivers include apparatus to enhance the apparent resolution of reproduced images by, for example, converting interlaced scanned images to non-interlace scanned images. Apparatus of this type typically introduces image artifacts in areas of image motion. These artifacts can be significantly reduced with knowledge of whether the source material was originally generated as video or as film. In addition video signal compression systems, particularly for use with NTSC video signals, can realize a twenty percent compression bonus if the source video can be determined to have been originated as film and converted to video by the technique known as 3:2 pull down. Video signal generated via 3:2 pulldown includes one duplicated field in every 5 field sequences, which duplicate fields may be excised to realize the compression bonus.

SUMMARY OF THE INVENTION

The method according to the invention utilizes the amplitudes of concurrent luminance pixels in adjacent fields to determine whether the source material originated from film or video signals. Comparisons are performed on concurrent luminance pixels signals from adjacent fields of video signal, and the results of said comparisons are checked against a predetermined pattern. Correlation, or lack there of, to said pattern determines film-mode or video-mode respectively.

BRIEF DESCRIPTION OF THE DRAWINGS

FIG. 1 is a pictorial representation of pixels in adjacent fields useful in describing the method of the invention, FIG. 2 is a pictorial representation indicating that the comparisons are accumulated over the entire field.

FIG. 3 is a pictorial representation indicating that comparison results are combined in four horizontal slices in filed n for determining film-mode detection.

FIG. 4 is a table of the combined results for determining the film-mode detection.

DETAILED DESCRIPTION

FIG. 1 illustrates four luminance pixels in the vertical/temporal plane. The amplitudes of pixel P1 from field $n-1$ and pixel P4 from field $n+1$ are compared with the amplitudes of the vertically adjacent pixels P2 and P3 from field n. From these comparisons, one of three possible results is determined for all pixels in respective fields:

a (+1) result, if $\{P1 < \min(P2,P3)$ OR $P1 > \max(P2,P3)\}$ AND $\{\min(P2,P3) \leqq P4 \leqq \max(P2,P3)\}$;

a (−1) result, if $\{P4 < \min(P2,P3)$ OR $P4 > \max(P2,P3)\}$ AND $\{\min(P2,P3) \leqq P1 \leqq \max(P2,P3)\}$;

or else a (0) if the foregoing conditions are not satisfied.

The comparison results are added over at least a portion of representative fields, for example by means of an up/down counter. Only the resultant sign of the sum of the comparison results of this segment is utilized and is necessary for further processing.

For determining the film mode condition, each field n is advantageously divided into four segments S1–S4 as shown in FIG. 3. The combined results for each of the four segments S1–S4 within a field must exhibit the same sign for a field to be represented by such same sign. In addition, these combined results must alternate between positive and negative from field to field as illustrated in FIG. 4. This can be checked by a second counter which counts the number of combined results within a test interval. If the sequence of signs alternate from field-to-field the sum of the counter will average zero indicating film-mode source material. To insure a modicum of noise immunity it is desirable to sum the positive and negative values over some minimum number of fields. The minimum number may be selected depending upon the application for which the film/video detector is being utilized. If the application is scan conversion the minimum number may be larger such as 32, and if the application is in compression the minimum number will be smaller such as 4.

Figure 5:
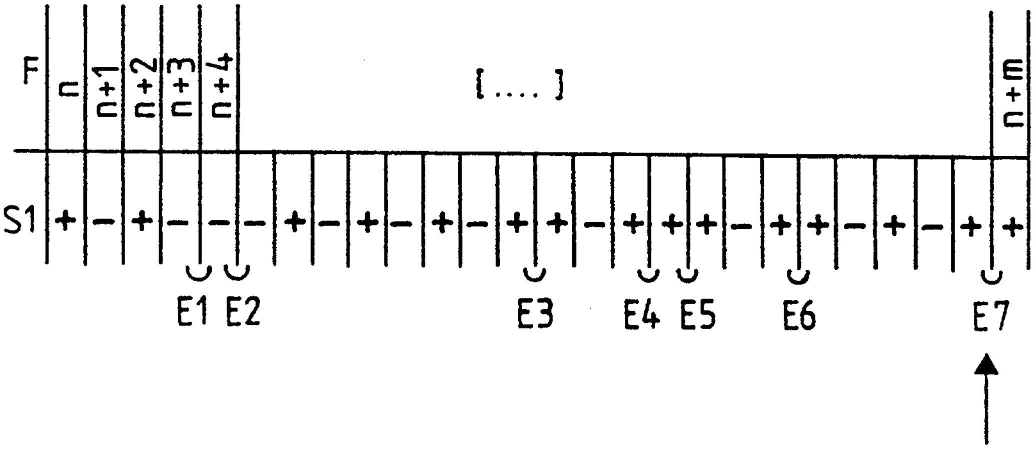
FIG. 5 is a table showing an example of a combination of results for the video-mode condition.

In order to determine the video-mode condition, field n is evaluated as a single segment and comparisons are accumulated over the entire field, as illustrated in FIG. 2. The combined results must deviate from the positive/negative alternating pattern. For example, a non-alternating positive/positive sequence as shown in FIG. 5, at fields E4 and E5 and again at E6, occurring a predetermined number of times over a portion of representative fields indicates that the signal is video source material. The number of errors may be recorded by an up/down counter or an accumulator. Since the sequence of signs alternates from field to field, the output of the up/down counter or accumulator will average zero if the source material is film mode. Alternatively if the output deviates by a predetermined amount from zero, video-mode source material is indicated. After each indication of the video-mode condition, the counter is reset and checking is recommenced from the beginning of the next field.

Figure 6:
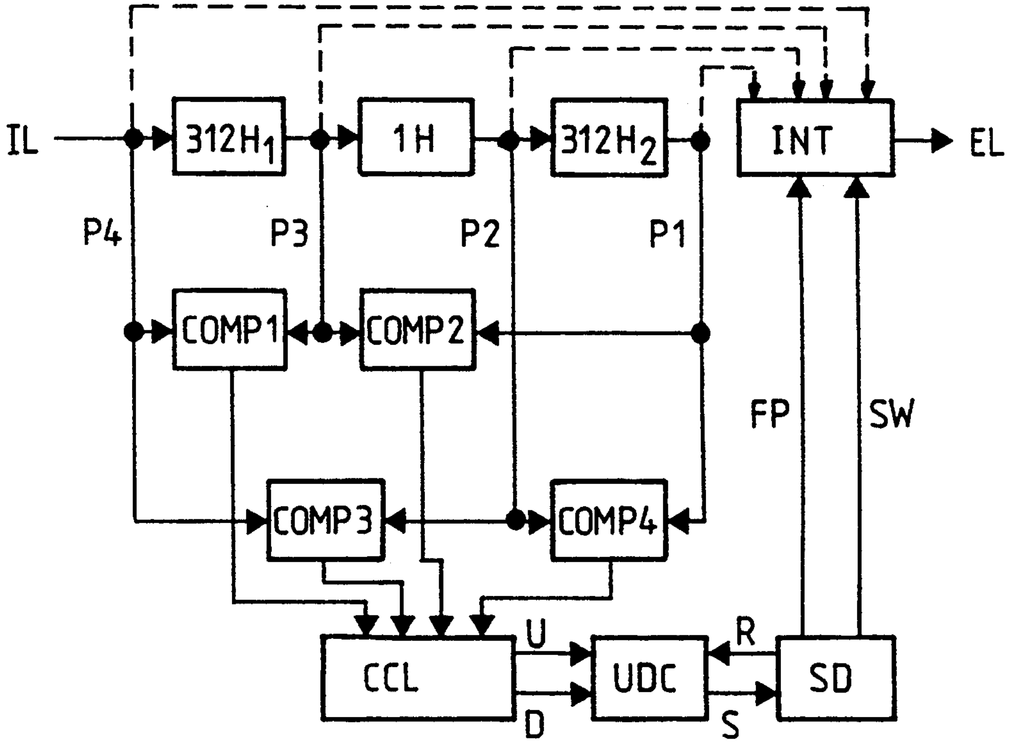
FIG. 6 is a block diagram of apparatus for film-mode detection embodying the present invention.

Exemplary apparatus employed in practicing the invention is illustrated in FIG. 6. It includes a delay circuit by which pixel values from three adjacent fields of video signal are concurrently provided. Specifically, the delay circuit consists of two field buffers, $\mathbf{312H_1}$ and $\mathbf{312H_2}$, which delay the video signal by 312 horizontal line periods, and a line buffer 1H, which delays the video signal by 1 horizontal line period. The serial connection of the three buffers, with the 1H line buffer intermediate the two 312H field buffers, provide concurrent pixels samples, from three adjacent fields, having the temporal-spatial relationship shown in FIG. 1. In FIG. 6, input pixel values are applied on input line IL and forwarded to a first field buffer $\mathbf{312H_1}$ which delays pixel values by 312 line intervals. The input pixel values are also coupled to a first comparator COMP1 and to a third comparator COMP3. The output samples from the first field buffer are coupled to the input of the one line buffer 1H and to the first comparator COMP1, and a second comparator COMP2. The output samples from the line buffer are coupled to the input of the second field buffer $\mathbf{312H_2}$, and to the third and fourth comparators COMP3 and COMP4. The output signals from the second field buffer are coupled to the second and fourth comparators COMP2 and COMP4.

Pixel P4 (illustrated in FIG. 1) is available at the input to the first field buffer, pixel P3 is available at the input to the line buffer, pixel P2 is available at the input to the second field buffer and pixel P1 is available at the output of the second field buffer. The outputs of the comparators are applied to a counter control logic (CCL) which combine the results of the comparators and assigns a value of +1, −1 or 0, depending on the respective output values of the comparators. That is to say:

a (+1) result is assigned, if
$\{P1 < \min(P2,P3) \text{ OR } P1 > \max(P2,P3)\} \text{ AND } \{\min(P2,P3) \leqq P4 \leqq \max(P2,P3)\}$;
a (−1) result is assigned, if
$\{P4 < \min(P2,P3) \text{ OR } P4 > \max(P2,P3)\} \text{ AND } \{\min(P2,P3) \leqq P1 \leqq \max(P2,P3)\}$;

or else a (0) value is assigned if the foregoing conditions are not satisfied. These tests are effectively looking for smooth image contours between fields. Nominally successive fields provided by film mode material will exhibit smooth image contours, but video mode source material will have less smooth image contours due to the occurrence of image motion between fields.

The +1, −1 or 0 value generated by the counter control logic CCL, is forwarded to an up/down counter (UDC). That is, positive results produce an up count pulse on the up count connection U and negative results produce a down count pulse on the down count connection D and zero results produce no pulses on either connection. The UDC effectively sums the positive and negative results and forwards the data on line S to a status detector SD.

The status detector SD latches the results of the up/-down counter for respective field intervals, and assigns a positive or negative value to respective fields depending upon whether the sum over the field is positive or negative respectively. The signs of the combined data over a sequence of fields are compared to a predetermined pattern, as described above, and film-mode or video-mode is detected. The status detector can be arranged to examine sums over an entire field as illustrated in FIG. 2 or to first examine sums over field segments as indicted in FIG. 3, and combine the partial results into field results and then proceed to examine the field results. If a corresponding error occurs, the counter UDC is reset via line R.

In systems which perform interlace to non interlace scan conversion, an interpolator (INT) may be included for generating and providing interpolated video values at an output terminal EL. The interpolator has input connections to various points in the delay circuit from which to access video samples to be utilized in the interpolation process. An output from the status detector of the film/video detection circuit is coupled to an interpolator (INT) on line SW. The phase of the current field which is determined by the sign of the combined data, is also forwarded to the interpolator on line FP.

The information items on line SW and FP are advantageously used in the interpolator INT which supplies both the original as well as estimated values for one or more of the pixels P1 to P4. In the case of film mode, frames can be generated in this interpolator which consist of two fields which have been pulled together. If the film mode is not present, a double median interpolation can be advantageously carried out as is described in, for example, DE-A-4211955.

In addition, the chrominance amplitudes can also be checked in accordance with the invention and the result can be logically combined with that for the luminance.

What is claimed is:

1. A method for film-mode detection comprising:

concurrently providing pixel values from at least first and second adjacent fields of video signal;

comparing amplitude values of respective pixels from corresponding image areas of said first and second adjacent fields, and for a predetermined one of said first and second adjacent fields assigning a first value to comparison results indicating that the amplitude value of respective pixels in horizontal lines of said first adjacent field are intermediate the amplitude values of vertically aligned pixels in two horizontal lines of said second adjacent field between which said horizontal lines of said first adjacent field are disposed, and assigning a second value if the amplitude value of said respective pixels in said first adjacent field are greater than the maximum of, or lesser than the minimum of the amplitude values of said vertically aligned pixels,; and combining the comparison results from at least a portion of respective said predetermined one of said first and second adjacent fields, to determine if values assigned said comparison results are predominantly said first or said second value, and assigning said predetermined one of said first and second adjacent fields the predominant first or second value; and establishing film mode detection if a sequence of values assigned a predetermined number of successive said predetermined one of said first and second adjacent fields, corresponds to a predetermined pattern.

2. A method for film-mode detection comprising:

concurrently providing pixel samples from three successive fields;

comparing corresponding pixels P1 and P4 from corresponding lines of said first and third fields respectively, to vertically aligned pixel pairs, P2 and P3, from successive lines of said second field, and between which said pixels P1 and P4 are vertically disposed;

allocating a first value to the results of respective comparisons if the amplitude of pixel P1 is intermediate the amplitudes of pixels P2 and P3, and the amplitude of pixel P4 is not intermediate the amplitudes of pixels P2 and P3, and allocating a second value if the amplitude of pixel P4 is intermediate the amplitudes of pixels P2 and P3, and the amplitude of pixel P1 is not intermediate the amplitudes of pixels P2 and P3, collating the results of comparisons over respective field intervals, and assigning said first or second values to respective fields depending upon whether comparisons for respective fields produced predominantly said first or said second value; and comparing the sequence of first and second values assigned to successive field, for a predetermined pattern.

3. The method according to claim 2, wherein the step of collating further comprises:

collating the results of comparisons over mutually exclusive portions of respective fields;

assigning a comparison result to respective fields equal to the collated results of the respective portions if the respective portions all exhibit the same result, and assigning an error result otherwise.

4. The method according to claim 2 wherein said step of allocating includes:

assigning a (+1) as the comparing result if
{P1 < min(P2,P3) OR P1 > max(P2,P3)} AND
{min(P2,P3) ≦ P4 ≦ max(P2,P3)};
assigning a (−1) as the comparing result if
{P4 < min(P2,P3) OR P4 > max(P2,P3)} AND
{min(P2,P3) ≦ P1 ≦ max(P2,P3)};

assigning a (0) as the comparing result if the foregoing conditions are not satisfied.

5. The method according to claim 4, wherein the step of collating comprises:

summing the comparison results over respective second fields of video signal;

assigning a positive or negative sign to respective second fields depending upon whether the resultant sum of the comparison results over each second field is positive or negative.

6. The method according to claim 5, wherein further including:

correlating the sequence of positive and negative signs assigned to successive fields to a predetermined pattern of alternating signs; and outputting a film-mode indication if a correlation is determined.

7. A method for film-mode detection comprising:

concurrently providing pixel samples from three successive fields, wherein first and fourth pixel samples from a first and third of said successive fields respectively, are vertically disposed between second and third pixels from a second of said three successive fields;

comparing said first and fourth pixel values with said second and third pixel values to determine whether said four pixel values represent contiguous image contours;

assigning a positive or negative value to the results of respective comparisons depending upon whether contiguous image contours are determined to occur;

summing the results of comparisons over respective field intervals, and assigning first or second values to respective fields depending upon whether the sum of results of comparisons for respective fields are positive or negative; and comparing the sequence of first and second values assigned to successive fields, for a predetermined pattern.

8. The method set forth in claim 7 wherein said first and second values correspond to plus and minus unit values and the step of comparing the sequence of first and second values assigned to successive fields, for a predetermined pattern comprises; summing the sequence of first and second values over a predetermined number of fields and comparing the resultant sum to a predetermined value.

9. An apparatus for film-mode detection comprising:

an input terminal for applying a video signal;

delay means, coupled to said input terminal, for concurrently providing pixel values from adjacent fields of video signal;

a means, coupled to said delay means, for comparing amplitude values of respective pixels from corresponding image areas of said adjacent fields to determine whether amplitude values of respective pixels in successive adjacent fields are in a first or a second monotonically increasing or monotonically decreasing relationship; and means, coupled to said comparing means, for determining if the comparison results over at least a portion of respective field intervals indicate that respective pixel amplitude values of said respective field intervals are predominantly in said first or second monotonically increasing or decreasing relationship, and assigning a first or second value respectively to said respective field intervals according to the predominance determined; and means, coupled to said means for determining, for establishing film mode detection if a resulting sequence of said first and second values assigned to a predetermined number of said respective field intervals corresponds to a predetermined pattern.

10. The apparatus set forth in claim 9 wherein said delay means includes;

a cascade connection of a first field delay element, a horizontal line delay element, and a second field delay element, said first and second field delay elements each providing a signal delay of a field interval less one half horizontal line interval; and wherein said means for comparing includes means for determining whether the pixels occurring at the input to the first field delay element have amplitudes intermediate the amplitudes of the pixels occurring at the input and output of the line delay element, and concurrently if the pixels occurring at the output of the second field delay element have amplitudes which are greater than the larger of, or lesser than the smaller of the amplitudes of the pixels occurring at the input and output of the line delay element.

11. The apparatus set forth in claim 10 wherein said means for comparing further includes:

means for determining whether the pixels occurring at the output of the second field delay element have amplitudes intermediate the amplitudes of the pixels occurring at the input and output of the line delay element, and concurrently if the pixels occurring at the input to the first field delay element have amplitudes which are greater than the larger of, or lesser than the smaller of the amplitudes of the pixels occurring at the input and output of the line delay element.

12. The apparatus set forth in claim 10 wherein pixels occurring at the input to the first delay means are designated P1, and pixels occurring at output connections of said first field delay element, said line delay element, and said second field delay element are designated P2, P3 and P4 respectively and said means for comparing includes;

means for assigning a (+1) comparison result if
{P1 < min(P2,P3) OR P1 > max(P2,P3)} AND
{min(P2,P3) ≦ P4 ≦ max(P2,P3)};
means for assigning a (−1) comparison result if
{P4 < min(P2,P3) OR P4 > max(P2,P3)} AND
{min(P2,P3) ≦ P1 ≦ max(P2,P3)};

means for assigning a (0) result if the foregoing conditions are not satisfied.

* * * * *